(12) United States Patent
Sadeghi et al.

(10) Patent No.: US 11,410,093 B2
(45) Date of Patent: Aug. 9, 2022

(54) INTERACTIVE DISPLAY INTERFACE HAVING MULTIPLE, EDITABLE VIEWS

(71) Applicant: Aurea Software, Inc., Austin, TX (US)

(72) Inventors: Kamyar J Sadeghi, Tiburon, CA (US); Mohammad A. Ketabchi, San Jose, CA (US); Ajay Khanna, Fremont, CA (US); Steve Wilber, Menlo Park, CA (US)

(73) Assignee: Aurea Software, Inc., Austin, TX (US)

( * ) Notice: Subject to any disclaimer, the term of this patent is extended or adjusted under 35 U.S.C. 154(b) by 71 days.

(21) Appl. No.: 16/919,308

(22) Filed: Jul. 2, 2020

(65) Prior Publication Data

US 2020/0334594 A1   Oct. 22, 2020

Related U.S. Application Data

(63) Continuation of application No. 12/566,456, filed on Sep. 24, 2009, now abandoned.

(60) Provisional application No. 61/099,763, filed on Sep. 24, 2008.

(51) Int. Cl.
*G06Q 10/06* (2012.01)
*G06Q 10/10* (2012.01)

(52) U.S. Cl.
CPC ........... *G06Q 10/06* (2013.01); *G06Q 10/103* (2013.01)

(58) Field of Classification Search
CPC .............................. G06Q 10/06; G06Q 10/103
USPC ....................................................... 705/301
See application file for complete search history.

(56) References Cited

U.S. PATENT DOCUMENTS

| 5,212,771 A * | 5/1993 | Gane ...................... G06Q 10/10 700/8 |
| 6,725,428 B1 * | 4/2004 | Pareschi ................ G06Q 10/10 715/205 |
| 7,451,403 B1 * | 11/2008 | Srinivasan ................ G06F 8/10 715/762 |

(Continued)

OTHER PUBLICATIONS

Nadja Damij, "Business Process Modelling using Diagrammatic and Tabular Techniques," 13 Business Process Management Journal 70, 88 (2007). (Year: 2007).*

(Continued)

*Primary Examiner* — Laura Yesildag

(57) ABSTRACT

A business process related computer software that displays a tabular view of a business process. Also, assigning types and/or attributes to worksteps of a business process and filtering the view of the business process based on the workstep types and/or workstep attributes. Also: (i) method for searching for worksteps based on a string pattern; (ii) a method for bulk update of worksteps satisfying search/filter criteria; (iii) a method for combining consecutive tasks into sub-tasks, or elevating sub-tasks to higher level tasks; (iv) a method for automatically setting the successor(s)/predecessor(s) workstep(s) as new worksteps are added or existing worksteps are removed; (v) a method for drilling down through a path in the process flow; (vi) a method for computing estimated duration for reaching a workstep along a path through the process flow; (vii) a method for identifying sequential and parallel worksteps and/or total duration through a timeline diagram; (viii) a method for printing process summary in tabular format; and/or (ix) methods of importing and exporting Microsoft projects.

10 Claims, 12 Drawing Sheets

(56) References Cited

U.S. PATENT DOCUMENTS

| | | | | |
|---|---|---|---|---|
| 7,506,302 | B2* | 3/2009 | Bahrami | G06Q 10/10 717/100 |
| 7,890,923 | B2* | 2/2011 | Elaasar | G06F 8/75 717/104 |
| 8,099,312 | B2* | 1/2012 | Jin | G06Q 10/063 705/7.17 |
| 8,423,477 | B2* | 4/2013 | Das | G06Q 10/06311 705/301 |
| 8,630,887 | B2* | 1/2014 | Yamamoto | G06Q 10/10 705/7.28 |
| 9,058,129 | B2* | 6/2015 | Sengupta | G06F 8/10 |
| 2006/0041503 | A1* | 2/2006 | Blair | G06F 16/116 705/37 |
| 2007/0192156 | A1* | 8/2007 | Gauger | G06Q 10/0633 705/7.19 |

OTHER PUBLICATIONS

R. Yamamoto, K. Yamamoto, K. Ohashi and J. Inomata, "Development of a business process modeling methodology and a tool for sharing business processes," 12th Asia-Pacific Software Engineering Conference (APSEC'05), 2005, pp. 8 pp.-, doi: 10.1109/APSEC. 2005.61 (Year: 2005).*
Notice of Allowance dated Apr. 1, 2020, filed in U.S. Appl. No. 12/566,456, pp. 1-15.
RCE Submission dated Jan. 29, 2020, filed in U.S. Appl. No. 12/566,456, pp. 1-16.
Final Rejection dated Jul. 29, 2019, filed in U.S. Appl. No. 12/566,456, pp. 1-34.
Response to Non-Final Office Action dated Jun. 30, 2019, filed in U.S. Appl. No. 12/566,456, pp. 1-17.
Non-Final Rejection dated Jan. 30, 2019, filed in U.S. Appl. No. 12/566,456, pp. 1-35.
Request for Continued Examination dated Oct. 18, 2018, filed in U.S. Appl. No. 12/566,456, pp. 1-11.
Advisory Action dated Oct. 5, 2018, filed in U.S. Appl. No. 12/566,456, pp. 1-3.
Response to Final Office Action dated Sep. 18, 2018, filed in U.S. Appl. No. 12/566,456, pp. 1-15.
Final Rejection dated May 18, 2018, filed in U.S. Appl. No. 12/566,456, pp. 1-17.
Response to Non-Final Office Action dated Jan. 11, 2018, filed in U.S. Appl. No. 12/566,456, pp. 1-18.
Non-Final Rejection dated Aug. 11, 2017, filed in U.S. Appl. No. 12/566,456, pp. 1-18.
Request for Continued Examination dated Sep. 21, 2015, filed in U.S. Appl. No. 12/566,456, pp. 1-24.
Final Rejection dated Mar. 20, 2015, filed in U.S. Appl. No. 12/566,456, pp. 1-29.
Response to Non-Final Office Action dated Jan. 15, 2015, filed in U.S. Appl. No. 12/566,456, pp. 1-16.
Non-Final Rejection dated Jul. 15, 2014, filed in U.S. Appl. No. 12/566,456, pp. 1-26.
Request for Continued Examination dated Sep. 13, 2012, filed in U.S. Appl. No. 12/566,456, pp. 1-14.
Final Rejection dated Apr. 13, 2012, filed in U.S. Appl. No. 12/566,456, pp. 1-22.
Response to Office Action dated Feb. 13, 2012, filed in U.S. Appl. No. 12/566,456, pp. 1-12.
Non-Final Rejection dated Sep. 26, 2011, filed in U.S. Appl. No. 12/566,456, pp. 1-18.

* cited by examiner

BUSINESS PROCESS SOFTWARE
308

TABULAR VIEW
MODULE
350

PATH ANALYSIS MODE
MODULE
362

DIAGRAM VIEW
MODULE
352

MS PROJECT IMPORT
AND EXPORT MODULE
364

PROPERTIES PANE
MODULE
354

PATTERN BASED
FILTER MODULE
356

ATTRIBUTE BASED
FILTER MODULE
358

TASK SORTING
MODULE
360

Fig. 12

INTERACTIVE DISPLAY INTERFACE HAVING MULTIPLE, EDITABLE VIEWS

RELATED APPLICATION

The present application claims priority to U.S. provisional patent application No. 61/099,763, filed on 24 Sep. 2008; all of the foregoing patent-related document(s) are hereby incorporated by reference herein in their respective entirety(ies).

BACKGROUND OF THE INVENTION

1. Field of the Invention

The present invention relates to computer software for working with business processes and workflows ("business process related computer software").

2. Description of the Related Art

One conventional piece of software is called MS Project. (Note: the term(s) "MS PROJECT" may be subject to registration-based and/or commonlaw trademark rights in various jurisdictions throughout the world, possibly including the United States.) MS Project is a project management software program which is designed to assist project managers in developing plans, assigning resources to tasks, tracking progress, managing budgets and analyzing workloads. MS Project includes a tabular view environment where plans and the like (but not workflows or models of business processes) are displayed to the business user in the form of a table, specifically a text based table. The tabular view is familiar and comfortable to regular users of MS Project. However, MS Project conventionally deals with business projects (see DEFINITIONS section) and not business processes (see DEFINITIONS section).

Business process related computer software is conventional. Conventionally, business process related software displays the business process or business process model to the user in the form of a diagram view and/or through a graphical user interface. For example visual editing tools such as Microsoft Visio and IDS Scheer allow modeling of a business process. (Note: the term(s) "MICROSOFT," "VISIO," and "IDS SCHEER" may be subject to registration-based and/or commonlaw trademark rights in various jurisdictions throughout the world, possibly including the United States.) These visual editing tools provide a stencil of graphical shapes to use in defining the process. To effectively use the visual editing tools (also known as diagramming tools), a learning curve is involved whereby each business user needs to learn the usage and semantics of the various graphical shapes, as well as how to do effective layouts to generate nice looking, easily interpreted diagrams.

As a further example, U.S. Pat. No. 6,968,343 ("Charisius") discloses methods and systems for integrating process modeling and project planning to provide workflow modeling and project planning integration tool that allows a user to model a business process or workflow, to create and activate a project plan based on the workflow, and to track the progress of the activated project plan using a diagram view and/or GUI.

US Patent Application 2008/0215389 ("Heidasch") discloses a computer implemented method and system for monitoring a business process of an executing business application. A representation of the business process associated with the business process element is generated to determine a problem in the business process of the executing business application. The Heidasch monitoring system collects information and provides a list of business processes and their status. The list contains a runtime view of the relevant business processes. The list is configured for display in an analytical UI. A particular business process can be selected from the list in the analytical UI, and then the monitoring system opens the business process model and configures the business process model with states that were reported by the particular business element to generate a graphical state view. Heidasch discloses that: (i) the graphical state view includes a representation of the state of particular business objects and process steps that participated in the business process execution; (ii) the representation of the state can include such graphical elements as a traffic light format with red (error), yellow (caution) and green (normal) states; and (iii) other types of representations can be used.

United States Patent Application 2001/0011366 ("Beck") discloses a GANT chart for a process executable by an operating system, which is an interactive input and display and editing interface wherein a programmer may program a business process having discrete steps and sub-steps. Beck states that such an interface is but one of a number of interfaces that would be suitable. Broadly speaking, by listing steps of a process in this chart along with parameters to be described more fully below, an application module is created which, by execution, performs the process step by step, and tracks completion of individual tasks, as well as providing reminders when and if allotted completion times are pending or exceeded, and so forth. Beck further states that GANT processes may also be illustrated by flow diagrams (typically PERT charts), and, that a chart depicted in FIG. 14 of Beck may be converted to an editable GANT flow chart as well. Beck discloses that standard products like MSProject Planner may be used to generate a PERT or GANT chart, and by using certain labels both for steps and resources, the generated file may directly become an IPM Object.

United States Patent Application 2009/0125359 "Knapic") discloses systems and methods for integrating a methodology management system with a project management system ("the system"). In some embodiments, the system can generate a project plan based on a project template. A project template can include a project task, an education component corresponding to the project task, a compliance factor, and a document creation rule. In various embodiments, the system includes a project management template for use with a project management tool; a synchronization engine that synchronizes data of the project management tool with an external data source; and a workflow engine that causes a workflow step to be performed based on a state of the project task.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

For relatively complex business processes, a large amount of time is spent in designing the process layout because it uses graphical icons and shapes and the like. Consider the example where a business user wants to quickly put together the outline of a large business process with a large number of tasks. With conventional business process modeling software using a graphical user interface (GUI), the business user must jump to a diagram view and proceed to drag and drop various shapes, define their properties, connect the shapes to each other, etc. However, it is believed that many business user would prefer to work with a project-like view of the process where he or she can outline the process by defining a set of tasks, defining the task/subtask relationships, and continue defining additional details. In some preferred embodiments of the present invention, the project-like view is used exclusively in defining a business process so that the process designer never needs to switch to the diagram view and/or GUI. In other preferred embodiments of the present invention, the process designer may switch between a plan-like view and other view(s), such as a GUI view, while designing the business process. The diagram view may still be a useful view, especially for complex flows. In other words, according to some embodiments of the present invention, the plan-like view will be the only view that works with the process creator and/or editor, while in other embodiments of the present invention, the process creator and/or editor can work with multiple views, including, but not limited to, the plan-like view.

The present invention is directed to business process related computer software that has one or more of the following features and/or methods: (i) displays a tabular view (see DEFINITIONS section) of a business process (see DEFINITIONS section); (ii) assigns types and/or attributes to worksteps of a business process and to filter the view of the business process based on the workstep types and/or workstep attributes; (iii) method for searching for worksteps based on a string pattern; (iv) a method for bulk update of worksteps satisfying search/filter criteria; (v) a method for combining consecutive tasks into sub-tasks, or elevating sub-tasks to higher level tasks; (vi) a method for automatically setting the successor(s)/predecessor(s) workstep(s) as new worksteps are added or existing worksteps are removed; (vii) a method for drilling down through a path in the process flow; (viii) a method for computing estimated duration for reaching a workstep along a path through the process flow; (ix) a method for identifying sequential and parallel worksteps and/or total duration through a timeline diagram; (x) a method for printing process summary in tabular format; and/or (xi) methods of importing and exporting Microsoft projects.

Various embodiments of the present invention may exhibit one or more of the following objects, features and/or advantages:

(i) the tabular view carries increasing level of detail about the process, including priority of tasks, their duration, performer, etc, that is not available in the diagram view;

(ii) provides an easier way of designing a process that naturally lends itself to breakup of process to tasks and sub-tasks. Using the familiar environment of MS Project, should make Business users feel comfortable defining a complex business process;

(iii) ability to generate a nice looking process diagram directly from the tabular view, without requiring the business user to re-arrange and optimize the layout, or learn about the existing shapes in the drawing toolbar, serves as a tremendous productivity boost;

(iv) the bi-directional support of editing in either of the views, provides user with the choice of switching from tabular view to diagram view, at any point in the design and analysis process without compromising the benefits of either view.

(v) the extensive filtering and sorting capabilities available in Tabular view, make it the preferred view for enhancing and improving the process flow as it undergoes change.

(vi) greater level of detail about the process, including priority of tasks, their duration, performer, etc.;

(vii) provides an easier way of designing a process that naturally lends itself to breakup of process to tasks and sub-tasks; using the familiar environment of MS Project, should make Business users feel comfortable defining a complex business process;

(viii) ability to generate a nice looking process diagram directly from the tabular view, without requiring the business user to re-arrange and optimize the layout, or learn about the existing shapes in the drawing toolbar, serves as a tremendous productivity boost;

(ix) provides user with the choice of switching from tabular view to diagram view, at any point in the design and analysis process without compromising the benefits of either view;

(x) improved view for enhancing and improving the process flow as it undergoes change; and/or (xi) helps user focus on an iterative approach to process design.

According to one aspect of the present invention, a set of one or more tangible computer readable storage media has stored thereon a business process software for working with a model of a business process made up of an ordered and hierarchically organized set of tasks. The business process software includes: a business process editing module; and a tabular view module. The business process editing module is programmed to allow a user to edit the model of the business process. The tabular view module is programmed to generate a tabular view of at least a portion of the model of the business process.

According to a further aspect of the present invention, a set of one or more tangible computer readable storage media has stored thereon a business process software for working with a model of a business process made up of a hierarchically organized set of tasks. The business process software includes: a business process editing module; a view module; and a pattern based filter module. The business process editing module is programmed to allow a user to edit the model of the business process. The view module is programmed to generate a view of at least a portion of the model of the business process. The pattern based filter module is programmed to filter tasks shown in the view generated by the view module based on a pattern entered by the user.

According to a further aspect of the present invention, a set of one or more tangible computer readable storage media has stored thereon a business process software for working with a model of a business process made up of a hierarchically organized set of tasks. The business process software includes: a business process editing module; a business process view module; and an attribute based filter module. The business process editing module is programmed to allow a user to edit the model of the business process. The business process view module is programmed to generate a view of at least a portion of the model of the business process. The attribute based filter module is programmed to filter tasks shown in the view generated by the view module based on one or more attribute(s) chosen by the user.

BRIEF DESCRIPTION OF THE DRAWINGS

FIG. 12 is a schematic view of an embodiment of business process software according to the present invention.

DETAILED DESCRIPTION OF THE INVENTION

One aspect of the present invention is software herein called a Mixed Mode Designer for Defining Business Processes. Modeling a business process is currently only possible through visual editing tools such as Microsoft Visio or IDS Scheer. These tools provide a 'stencil' of shapes to use in defining the process. To effectively use the diagramming tool, a learning curve is involved where business user needs to understand the usage and semantics of the shapes as well as optimal layout for generating nice looking diagrams. The mixed mode designer enables business user to design a process in either the diagram or the tabular view. The tabular view provides a more familiar environment of the MS Project. Moreover, MS Project documents may be directly imported to in to the designer for further development of the process model in either the tabular or the diagram view. The modification to the process model is possible in both views.

Figure 1:
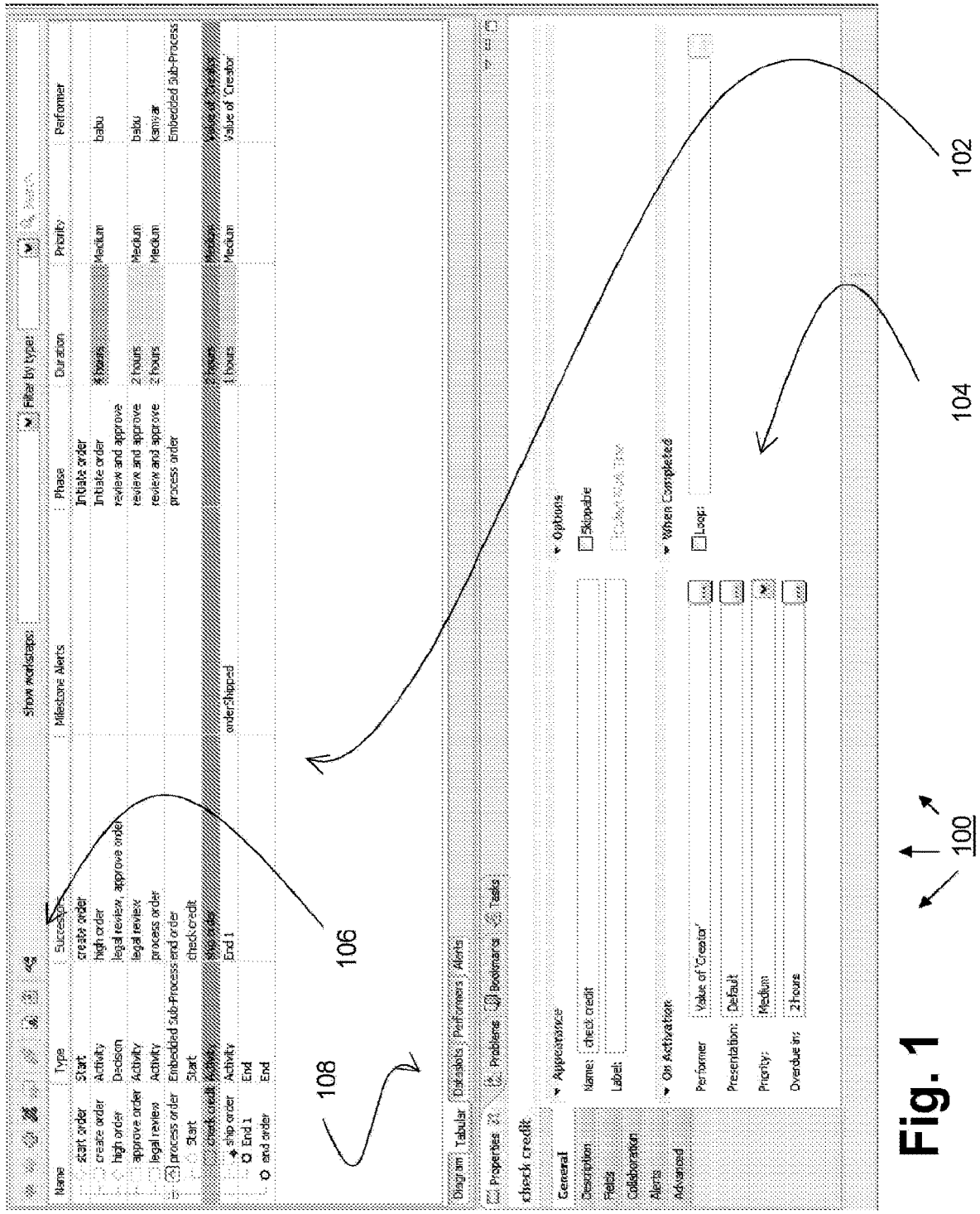
FIG. 1 is a screenshot of a first display generated by an embodiment of business process software according to the present invention.

FIG. 1 is a screenshot 100 of an Integrated Development Environment ("IDE") generated by an embodiment of business process software according to the present invention. Screenshot 100 includes: tabular business process view portion 102 and properties pane 104; design buttons 106; and business process view chooser menu 108. The business process being modeled by the business process software is show in tabular form at tabular business process view portion 102. In the tabular business process view portion, each task is assigned a row of the table. The reason that the business process is shown in the tabular view in screenshot 100 is because the option "Tabular" is selected in business process chooser menu 108.

The design buttons 106 on a design button toolbar allow a user to create new tasks (green cross button), delete existing tasks (red X button), group tasks into subtasks, view the task in diagram view or ungroup subtasks into tasks. Properties pane 104 allows a user to view and edit the extensive set of properties associated with a selected item from the tabular view. For example, in screenshot 100, the row corresponding to the "check credit" item is shaded, with the result that the properties of the "check credit" item are shown in properties pane 104 of screenshot 100.

Many variations are possible for the screenshot 100 display. For example, the properties pane could be omitted. As a further example, the properties pane could be in the form of a pop-up window selectively activated by the user. As a further example, the properties pane could be a separate (full screen) view, selectable through business process view chooser menu 108. As a further example, the information of the properties pane could be integrated directly into the tabular view itself, perhaps with a show or hide button associated with each task and sub-task. As a further example, the may be more than one layer of sub-tasks, such as sub-sub-tasks or sub-sub-sub-tasks. As a further example, sub-tasks could be visually represented as a third dimension (that is, depth dimension) in the tabular view, making the view a 3D matrix form of a table. Despite the numerous variations possible in presenting a tabular view of a business process, one important feature of some embodiments of the present invention to recognize is the fact that the business process is in tabular view. In tabular view 102, the business process that has been modeled by the business process software includes the following tasks (or items) in the following order: start order, create order, high order, approve order, legal review, process order and end order. The process order task includes the following sub-tasks in the following order: Start, check credit, ship order, and End 1. In screenshot 100, the columns associated with each task are as follows: Type, Successors, Milestone Alerts, Phase, Duration, Priority and Performer.

The tabular view mode of design also helps user focus on a hierarchical approach to process design. First step is to flesh out the top level "tasks" that need to be completed to achieve the end result. Each task is then broken into its constituent sub-tasks. Sub-tasks may then be broken into sub-sub-tasks, and so on. This iterative, hierarchically-organized process continues until at the lowest level(s), yielding the concrete worksteps can be associated with performers and resource and time can be allocated to each workstep. (Note: not all worksteps need be at the same hierarchical level—for example, some worksteps may be sub-tasks, while others may be sub-sub-tasks). Designing a process in a hierarchical, top down fashion as promoted by the tabular view, is a very common technique used by business users when using outlining or requirements gathering tools.

Yet another approach to designing a business process could be a hierarchical, bottom up approach where designing a process in tabular view may involve brainstorming sessions where all the concrete tasks that need to be completed to reach the desired results are added, then they are grouped into lower level tasks and a hierarchy of tasks is derived. Exception flow elements and loops are then added to complete the design process. It is believed that the tabular views of the present invention are more amenable to a hierarchical approach, whether top down, bottom up or some mixture of the two approaches.

Once the tasks and their relationships are defined, the next step is to associate the attributes for each of the tasks. This could be a painstaking activity, specially for processes with large number of worksteps. Thanks to the advanced filtering capabilities of the Tabular view, this stage of process design is greatly simplified. User may filter a subset of activities with common attributes, then select the set and using the common properties pane of the tabular view set the duration, priority or the performer of the worksteps in bulk. It is also possible to quickly set the values of the properties individually directly from the tabular view itself. For example, clicking on the Priority cell of a of the tasks can trigger a combo-box that presents the user with options for the setting the value of the priority. (See FIG. 1 at priority column of tabular view 102.)

Figure 2:
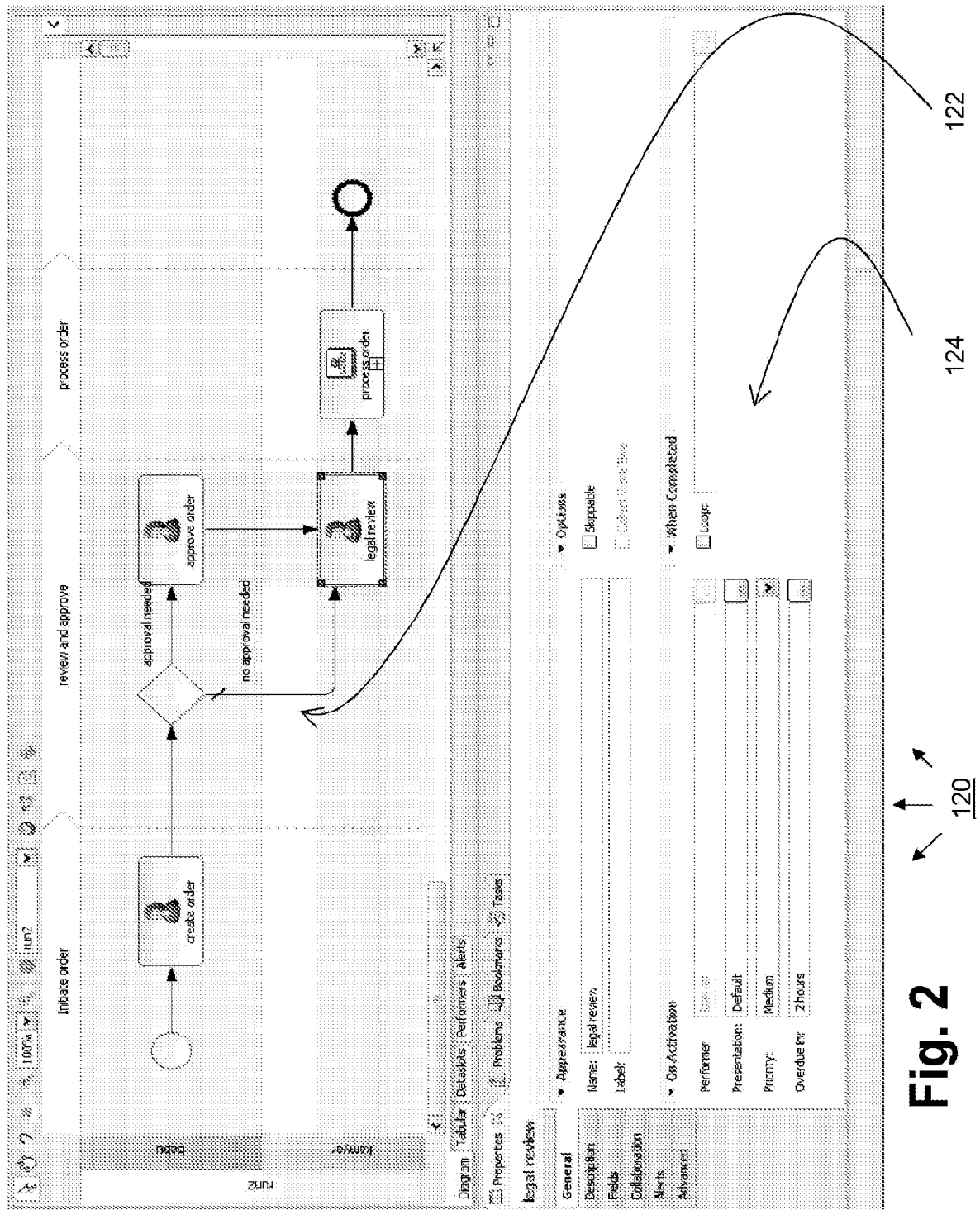
FIG. 2 is a screenshot of a second display generated by an embodiment of business process software according to the present invention.

FIG. 2 is another screenshot 120 of an IDE generated by the business process software. Screenshot 120 includes: diagram business process view portion 122; and properties pane 124. Clicking the 'Show workstep in Diagram' button of business process view chooser menu 108 (see FIG. 1) switches the view from screenshot 100 to screenshot 120. It is also noted that a different task (specifically "legal review") is highlighted in diagram business process view portion 122 and set forth in detail in properties pane 124. Preferably, switching views between tabular and diagram will not switch the identity of the highlighted task, but a user will generally switch between tasks frequently in either or both views while working with a model of a business process.

Figure 3:
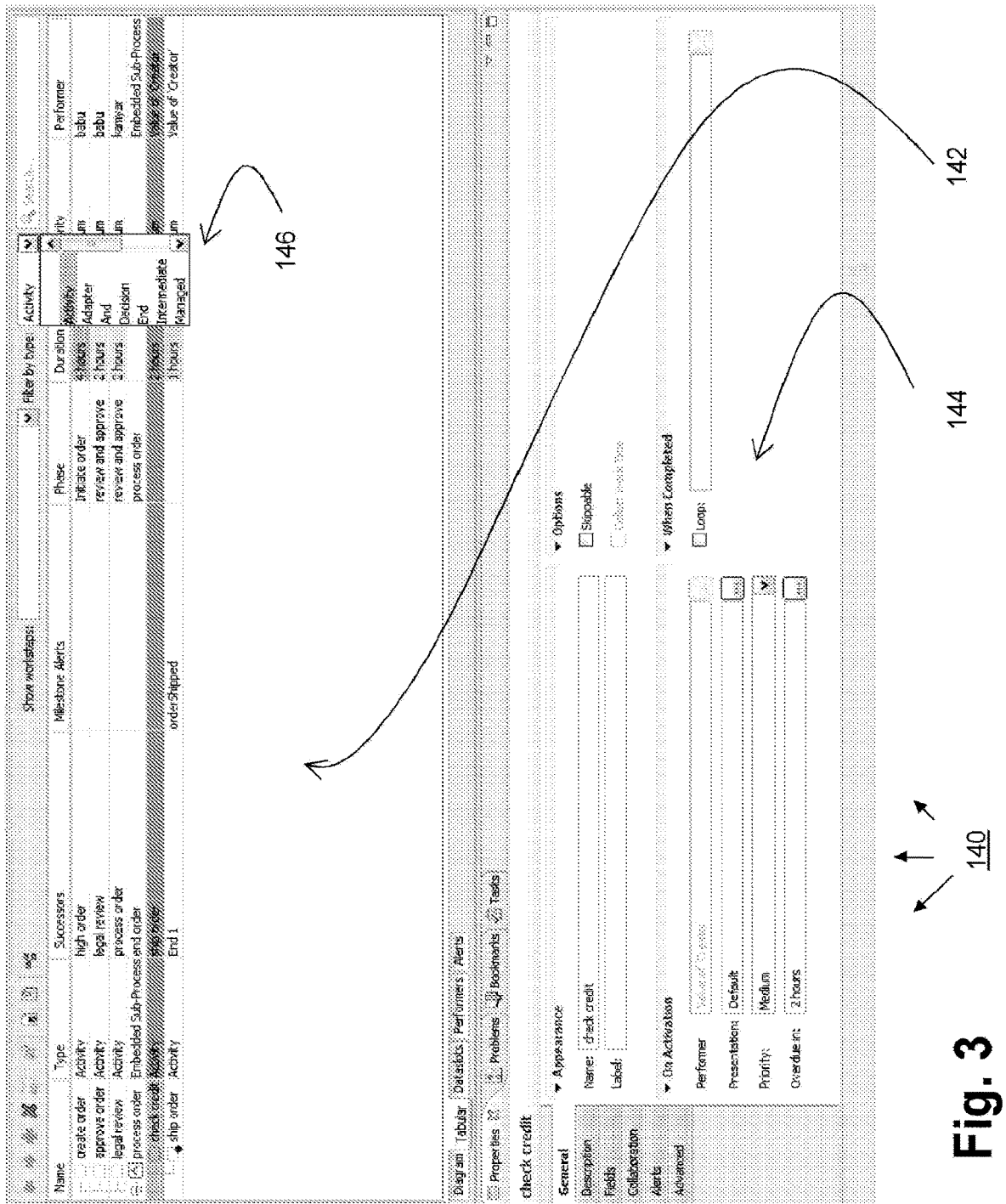
FIG. 3 is a screenshot of a third display generated by an embodiment of business process software according to the present invention.

FIG. 3 is another screenshot 140 of an IDE generated by the business process software. Screenshot 140 includes: tabular business process view portion 142; properties pane 144; and filtering pulldown menu 146. As shown in FIG. 3, the business process software includes a filter feature so that fewer than all tasks and/or sub-tasks are shown in the tabular view. In screenshot 140, the filter choice of "Activity" has been selected by the user, meaning that all but Activity tasks (or worksteps) are filtered out. In this example, the user can see all the tasks assigned to individuals without the intermediate gateways and adapters. As shown at the filtering pulldown menu 146, other filtering criteria may be chosen in this embodiment of the business process software. Still other filtering criteria (now known or to be developed in the future) may be (additionally or alternatively used. Some filters may act in an inverse way to the "Activity" filter shown in screenshot 140—for example, a "Not Activity" filter could filter out only Activity tasks and show all non-Activity tasks.

Figure 4:
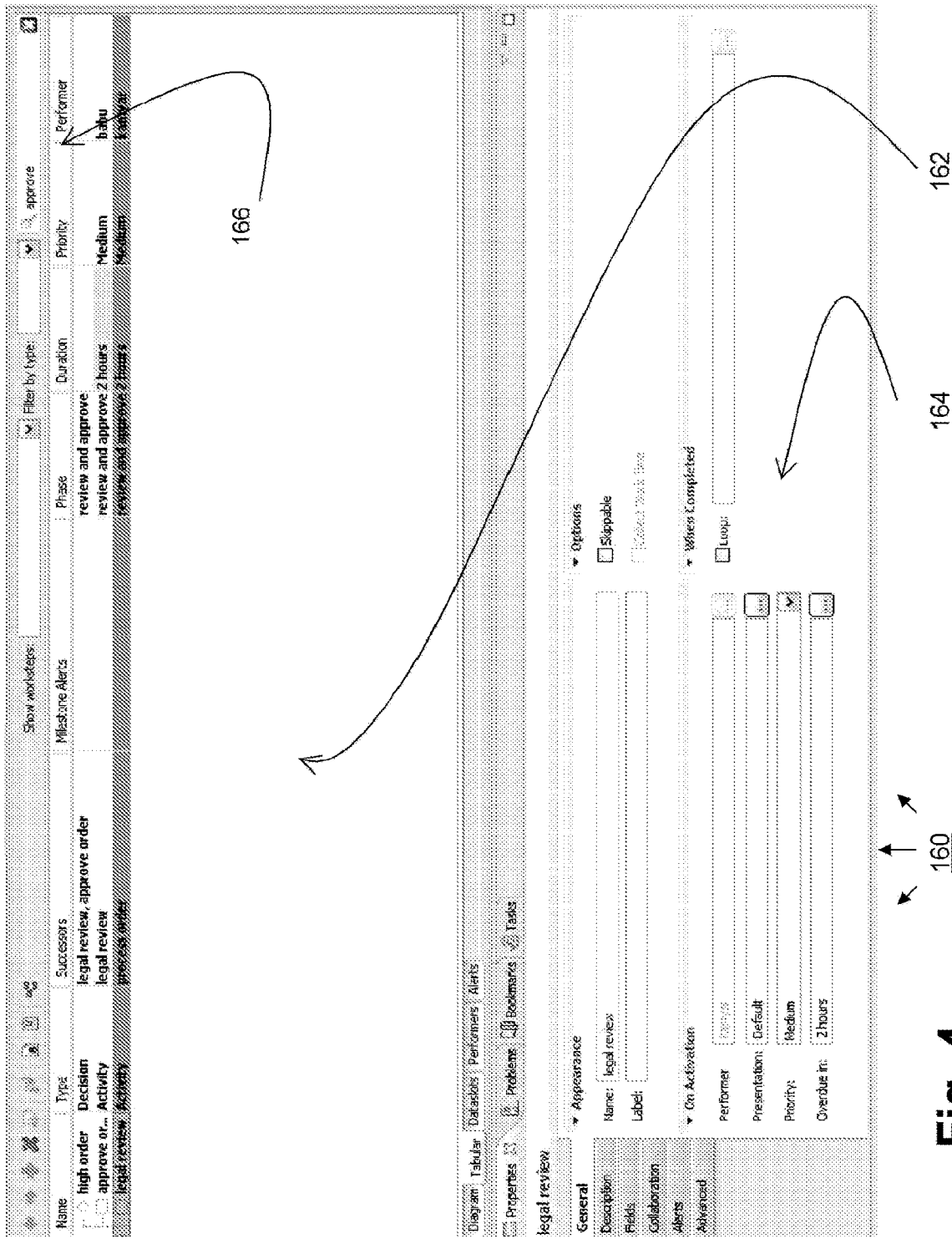
FIG. 4 is a screenshot of a fourth display generated by an embodiment of business process software according to the present invention.

FIG. 4 is another screenshot 160 of an IDE generated by the business process software. Screenshot 160 includes: tabular business process view portion 162; properties pane 164; and filter pattern entry bar 166. As shown in FIG. 4, a user as entered the pattern "approve" in filter pattern entry bar 166. This causes all worksteps to be filtered out, except for those worksteps matching the user's chosen pattern. In this example, all worksteps that include the pattern approve as part of their name, successor, predecessor, or phase are shown in the tabular view 162. In other words, the business process is searchable as a text-based database. This can help a user find a portion of interest in a lengthy business process for editing or the like. In some embodiments of the present invention, this pattern based filtering may additionally be available in the diagram view. In other, not necessarily preferred, embodiments of the present invention, there may not even be a tabular view at all, but only a graphical or diagram view and pattern based filtering.

Figure 5:
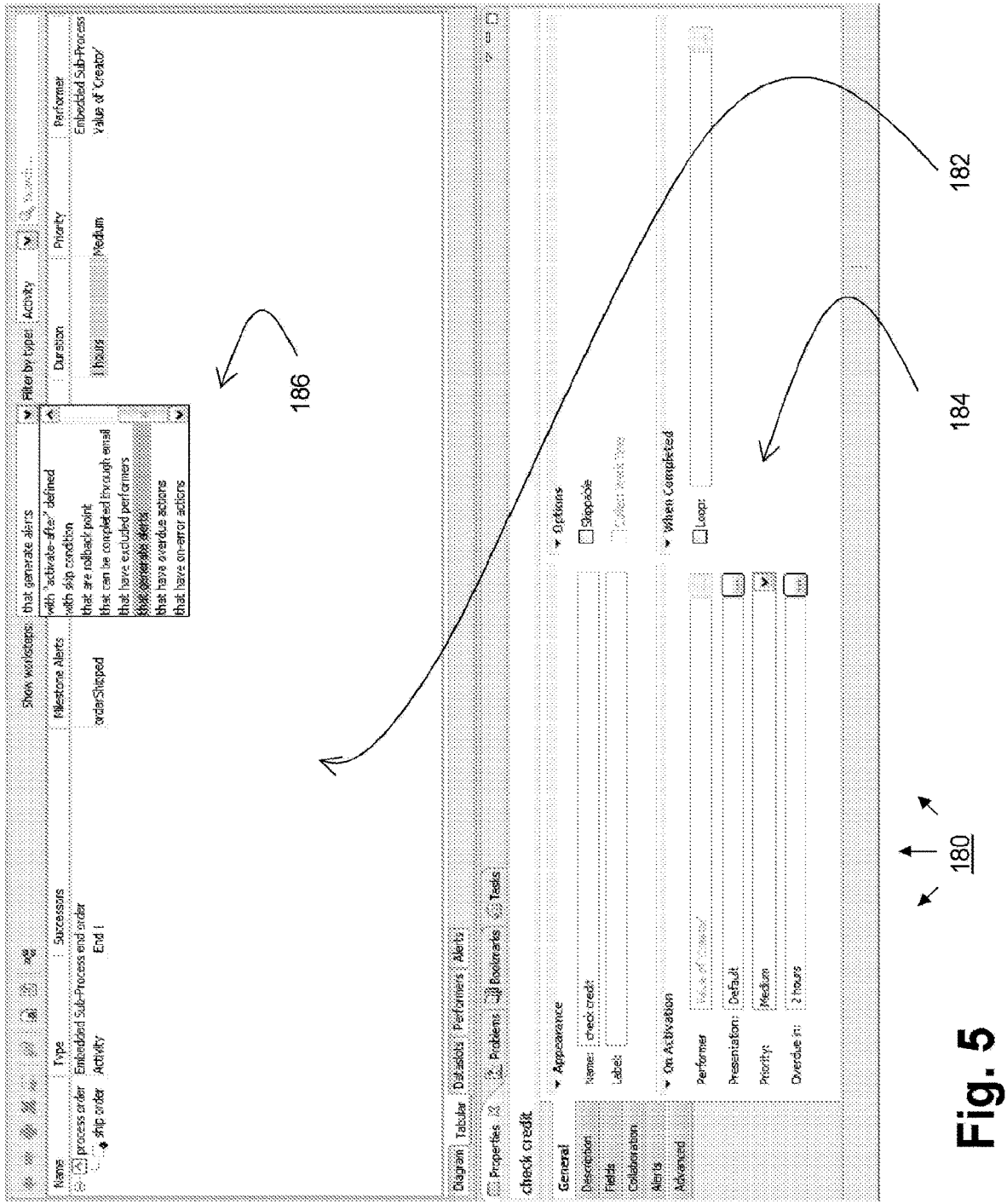
FIG. 5 is a screenshot of a fifth display generated by an embodiment of business process software according to the present invention.

FIG. 5 is another screenshot 180 of an IDE generated by the business process software. Screenshot 180 includes: tabular business process view portion 182; properties pane 184; and attribute filtering entry bar 186. As shown in FIG. 5, a user has chosen the attribute "that generate alerts" in attribute filtering entry bar 186. This causes all worksteps to be filtered out, except for those worksteps having attributes matching the user's chosen attribute selection. In this example, all worksteps that generate alerts are shown in the tabular view 182. In other words, the business process is searchable as an attribute-based database. This can help a user find a portion of interest in a lengthy business process for editing or the like. In some embodiments of the present invention, this attribute based filtering may additionally be available in the diagram view. In other, not necessarily preferred, embodiments of the present invention, there may not even be a tabular view at all, but only a graphical or diagram view and attribute based filtering.

Each activity worksteps in one exemplary IDE, called BPM Studio by Savvion, may have over 15 attributes associated with it. (Note: the term(s) "BPM STUDIO" and "SAVVION" may be subject to registration-based and/or commonlaw trademark rights in various jurisdictions throughout the world, possibly including the United States.) An exemplary and non-exhaustive set of attributes are listed below:

Has a skip condition
Is a looping workstep
Has pre-condition
Has pre-script
Has post-script
Is an alert generating workstep
Has overdue action
Has on-error action
Has performer exclusion list
Has activation rules With only the diagram view at his/her disposal, a user will generally have a hard time in identifying the subset of worksteps that have a specific attribute. For example, to find all the worksteps that have overdue actions, user must click each and every activity workstep in the flow, to view the attribute in the properties pane. Using the exemplary IDE, BPM Studio, with the enhanced Tabular view support, user need only select the option 'have overdue actions' from the Show worksteps combo-box and the worksteps that have overdue actions are readily filtered. Note that user may also easily identify the filtered workstep(s) in the diagram by selecting the workstep and clicking the 'show workstep in the diagram' button of the tabular view toolbar.

Figure 6:
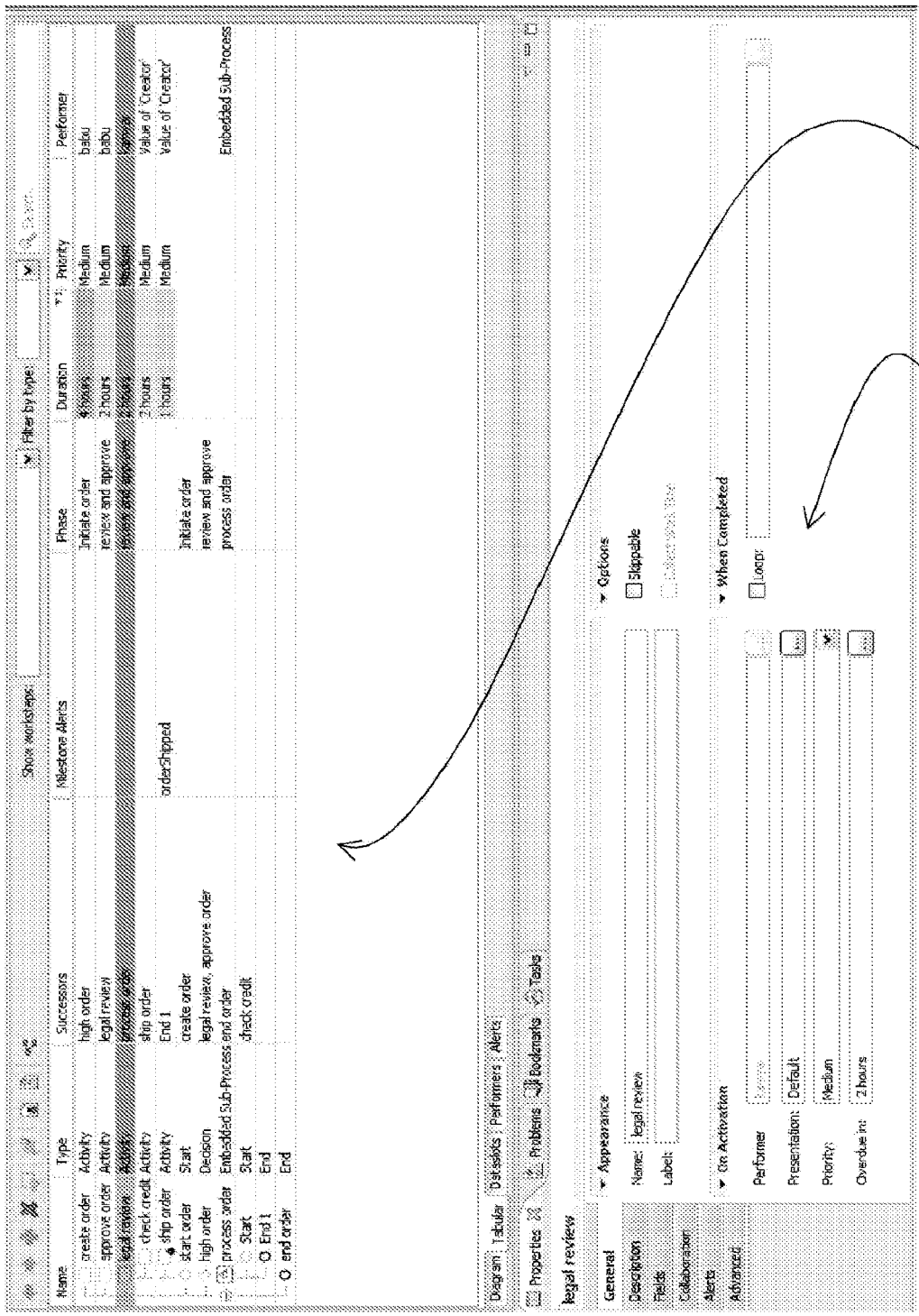
FIG. 6 is a screenshot of a sixth display generated by an embodiment of business process software according to the present invention.

FIG. 6 is another screenshot 200 of an IDE generated by the business process software. Screenshot 200 includes: tabular business process view portion 202; and properties pane 204. As shown in FIG. 6, the order of the tasks (and sub-tasks) in a table may be sorted according to their respective values with respect to a chosen field. For example, in screenshot 200, a user has chosen to sort the tasks based on the values in the "Duration" field in descending order (that is, longest to shortest duration). Any column can be sorted on. Sorting can be ascending or descending. Sorting may be alphabetical, numerical or other (for example, based on the length of the character string in a chosen field).

Figure 7:
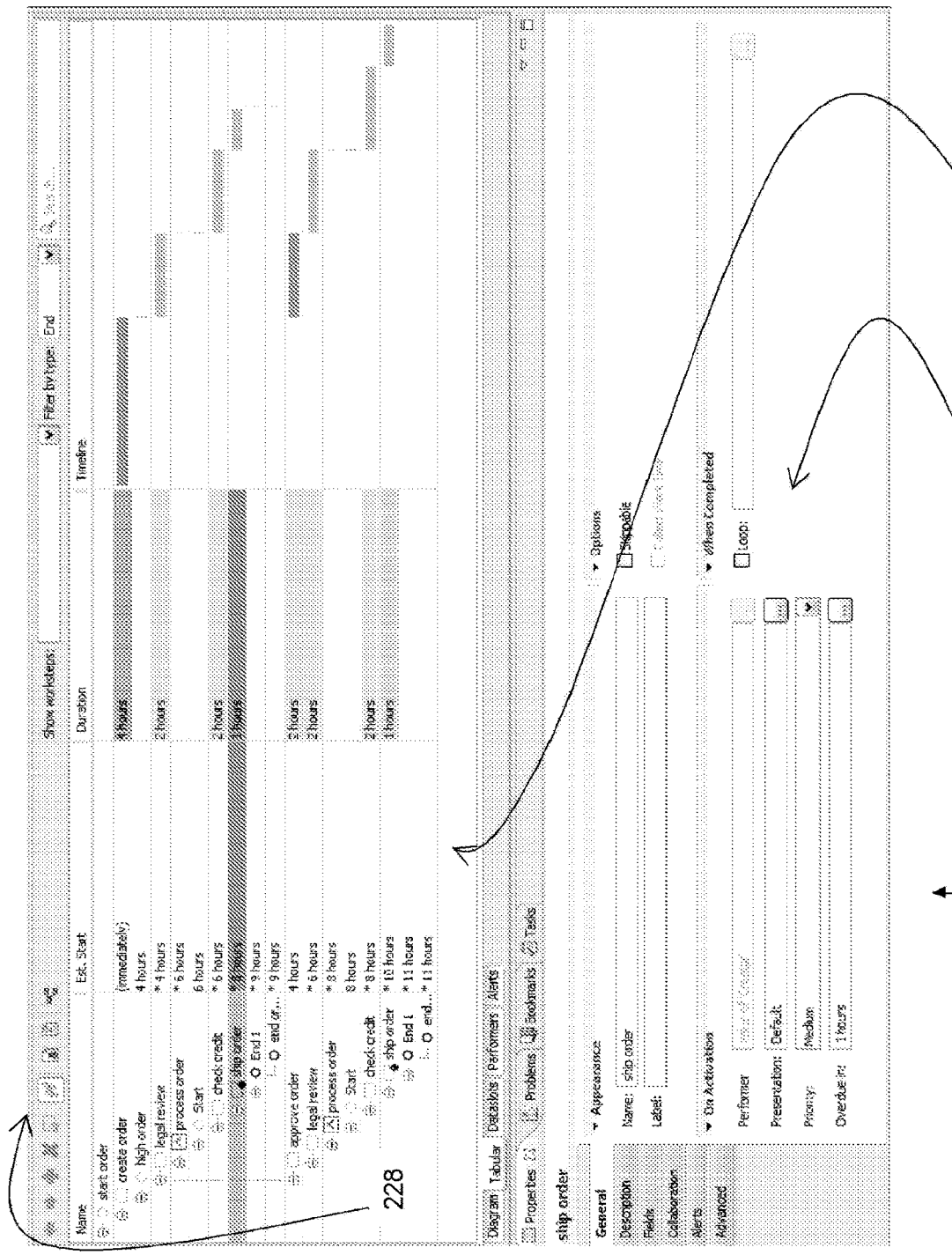
FIG. 7 is a screenshot of a seventh display generated by an embodiment of business process software according to the present invention.

FIG. 7 is another screenshot 220 of an IDE generated by the business process software. Screenshot 220, as shown in FIG. 7, includes: tabular business process view portion 222;

properties pane 224; and path mode button 228. The tabular view 222 shows path analysis mode, which has been activated by a user's selection of path mode button 228. In path analysis mode, a user can drill down a path and view an estimated time until activation of each of the worksteps along the path. The Timeline column of tabular view 222 helps identify sequential and parallel execution tasks as well as their relative time distance from the start of the instance.

A typical business process, such as an order processing process, may have several paths through the process. Examples include expedited processing based on customer's level, special handling for certain orders, credit check for amounts over a limit, etc. As part of analyzing the process, user may want to drill down through a path and identify steps involved in reaching a certain step along the path and additionally an estimate of how long it might take to reach that step from the point of instance creation. The path analysis mode of the present invention makes it easy for users to do static path analysis. Starting from root node user may continue to expand along a path. At each node being able to identify estimated time for arriving at that node, the duration associated with nodes completion and the timeline status of the instance at the point of the node's activation.

Figure 8:
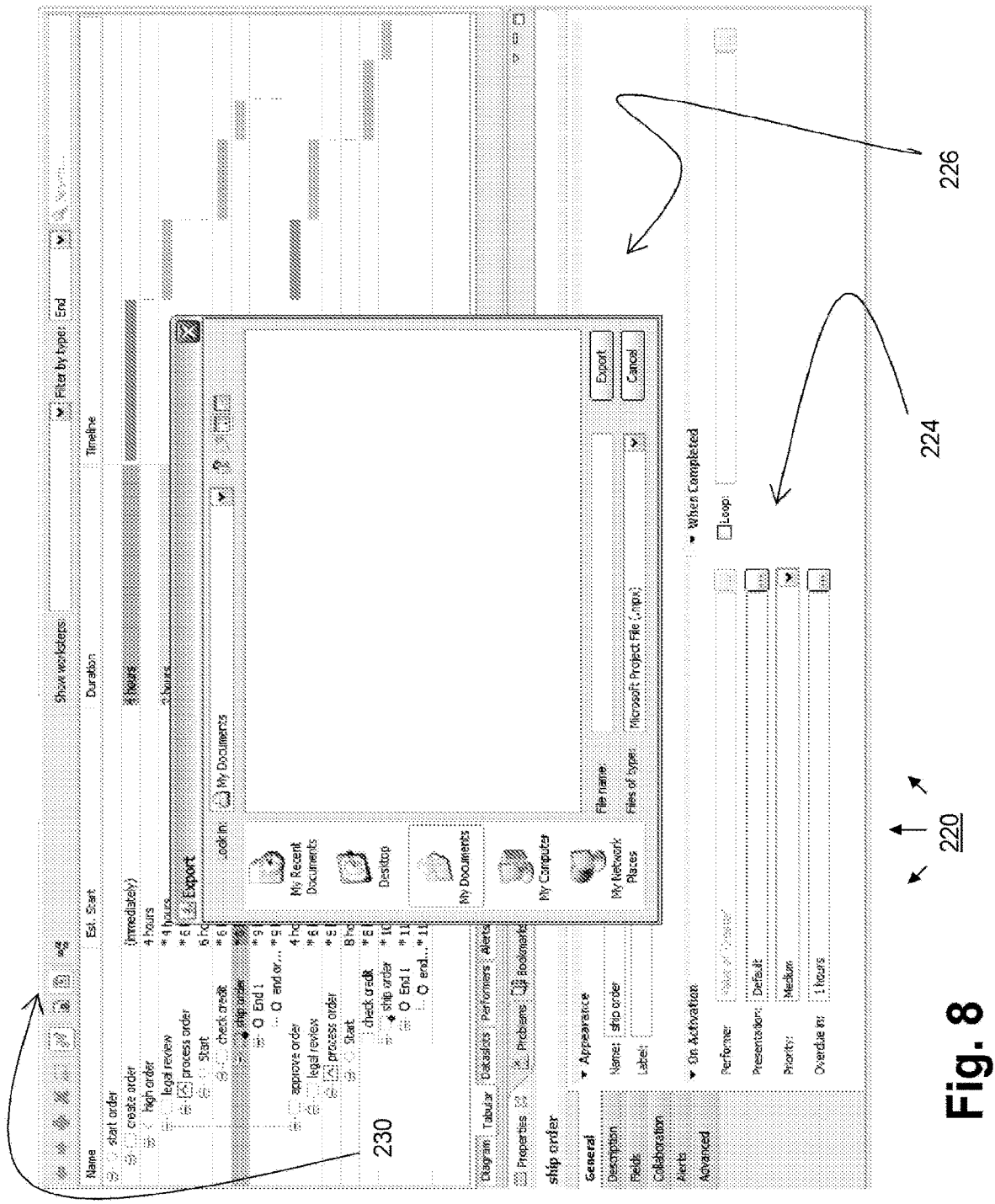
FIG. 8 is a screenshot of a eighth display generated by an embodiment of business process software according to the present invention.

FIG. 8 is a variation on screenshot 220 of an IDE generated by the business process software. Screenshot 220, as shown in FIG. 8 includes: tabular business process view portion (not separately numbered in FIG. 8); properties pane 224; export window 226; path mode button (not separately numbered in FIG. 8); and export button 230. Clicking export button 230 allows a user to export the business process to a file formatted as a Microsoft Project File. Import from MS Project is also supported (see button with red arrow next to export button 230 in FIG. 8).

Figure 9:
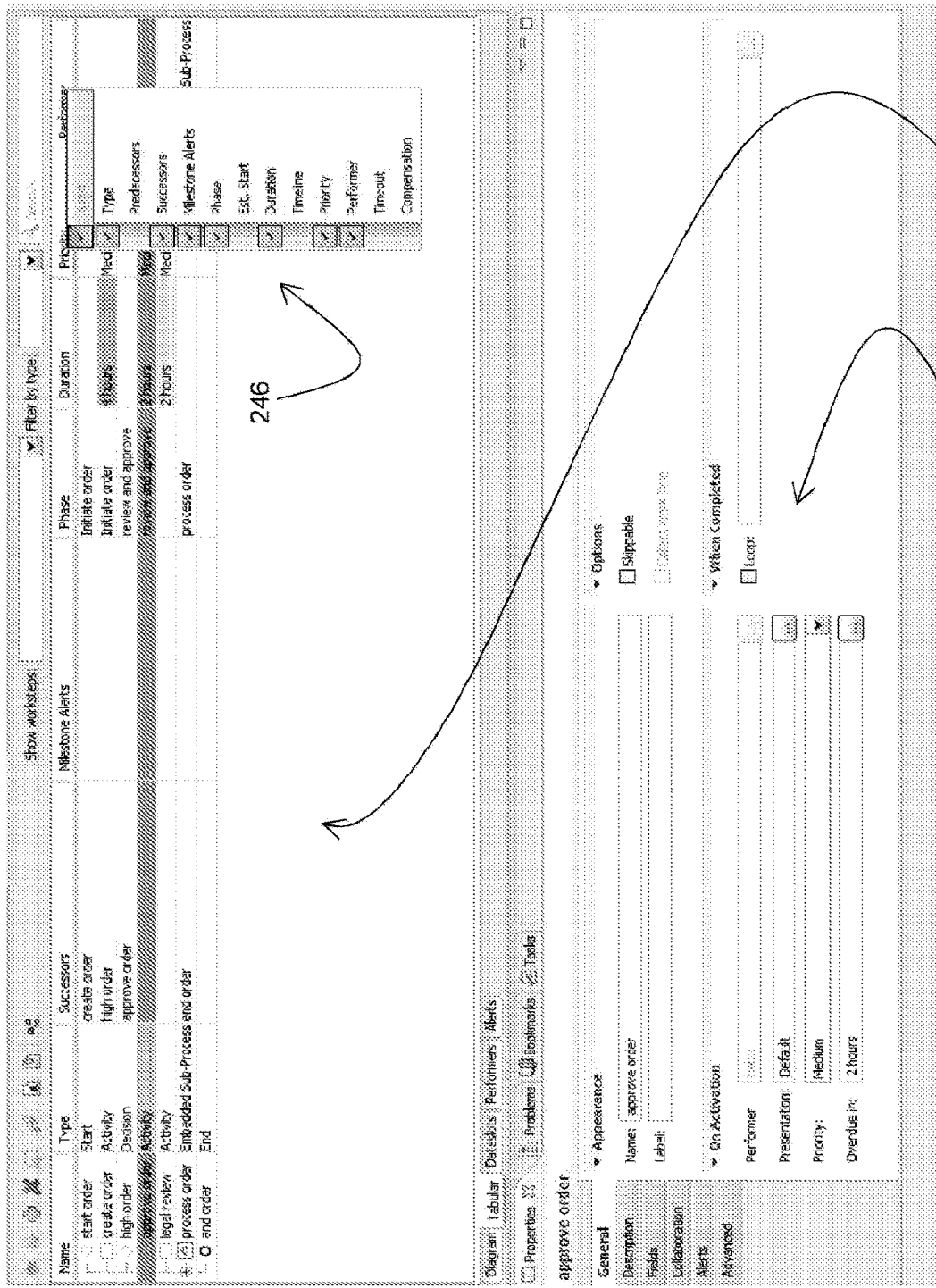
FIG. 9 is a screenshot of a ninth display generated by an embodiment of business process software according to the present invention.

FIG. 9 is another screenshot 240 of an IDE generated by the business process software. Screenshot 240, as shown in FIG. 9, includes: tabular business process view portion 242; properties pane 244; and pop-up checklist 246. Clicking any of the column headers of the tabular view pops up a checklist 246 of all the supported attributes that can be shown or hidden as part of the view. For example, assume that a user needs to know which task takes the longest to complete. In the absence of tabular view support in the IDE, this is a relatively difficult thing to do. The user of a conventional diagram-view-only IDE would need to click each task to reveal its duration in the properties pane, and must also record the duration to determine whether it is in fact the one that takes longest to complete. With the tabular view of the present invention, all a user needs to do is to right click the any of the column headers of the tabular view and select duration, if not already visible, and click the column to sort the activities based on their duration. Each click toggles the mode to ascending, descending or no sorting.

Figure 10:
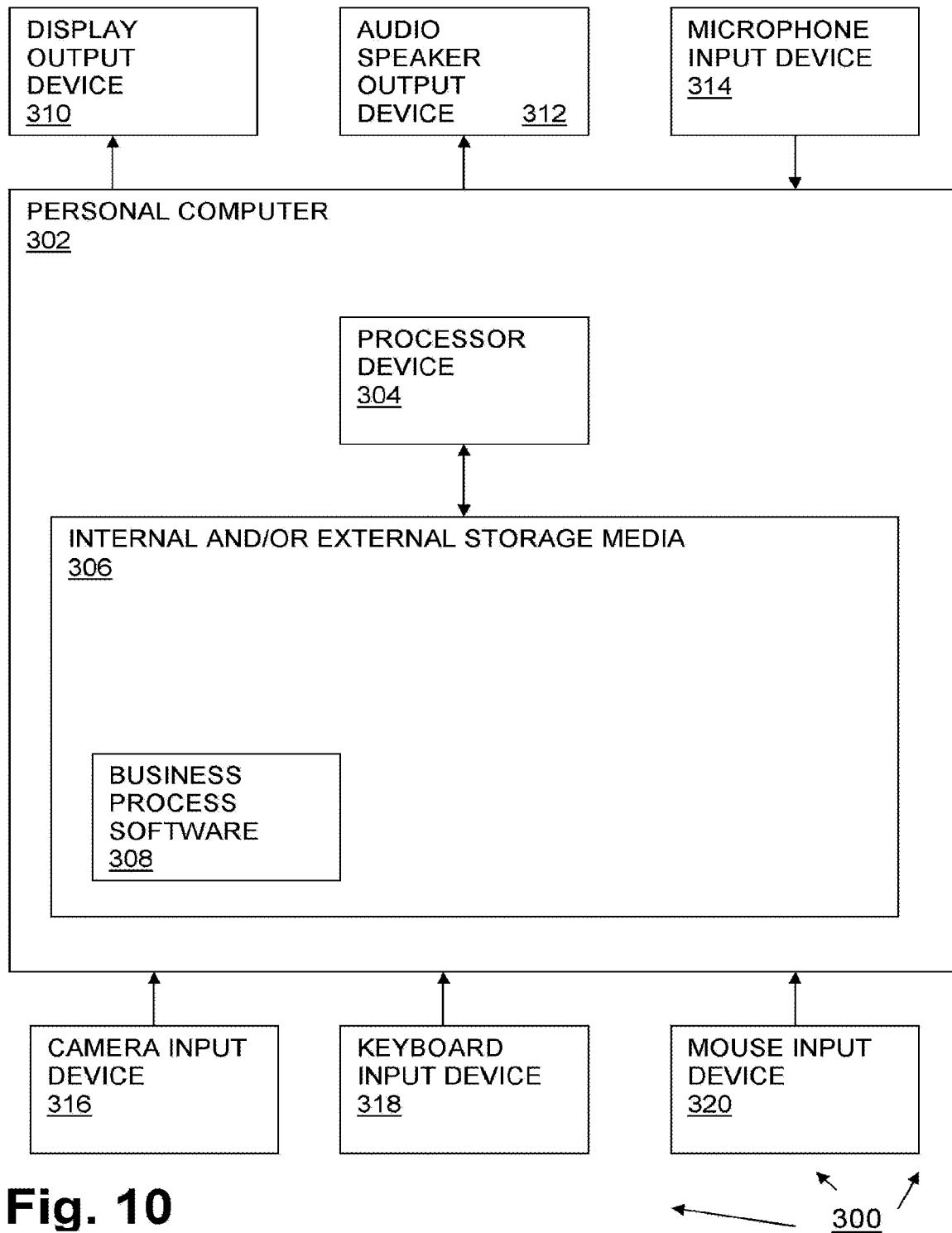
FIG. 10 is a schematic view of a first embodiment of a computer system including an embodiment of business process software according to the present invention.

FIG. 10 shows a first exemplary computer system 300 that includes business process software according to the present invention. System 300 includes: personal computer 320; display output device 310; audio speaker output device 312; microphone input device 314; camera input device 316; keyboard input device 318 and mouse input device 320. Personal computer 302 includes: processor device 304; and internal and/or external storage media 306. Internal and/or external storage media are preferably a tangible medium (or media) capable of storing computer readable data thereon and/or therein. Internal and/or external storage media 306 includes business process software 308 (which will be further discussed below in connection with FIG. 12). In system 300, a user (not shown) uses the components of system 300 to run business process software 308 and to thereby work with business processes.

Figure 11:
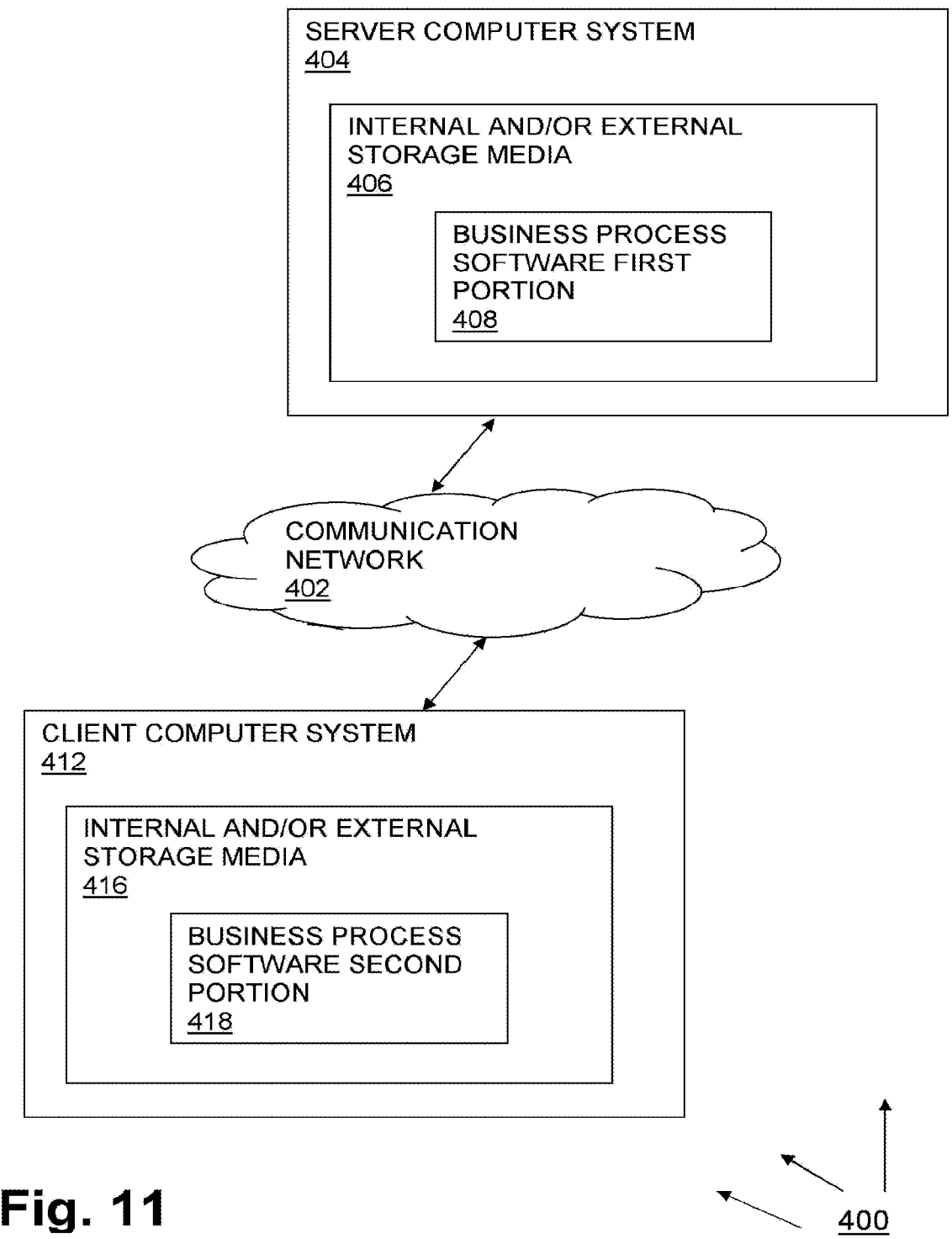
FIG. 11 is a schematic view of a first embodiment of a computer system including an embodiment of business process software according to the present invention.

FIG. 11 shows a second exemplary computer system 400 that includes business process software according to the present invention. System 400 includes: communication network 402; server computer system 404; and client computer system 412. Server computer system 404 includes: internal and/or external storage media 406. Internal and/or external storage media 406 includes: business process software first portion 408. Client computer system 412 includes: internal and/or external storage media 416. Internal and/or external storage media 416 includes: business process software second portion 418. In system 400, the business process software is distributed over multiple hardware components at locations remote from each other. The user is present at client computer system 412, but at least a portion of the hardware and/or software capabilities for running the business process software are delivered from server computer system 404 through communication network 402.

FIG. 12 shows business process software 308, including: tabular view module 350; diagram view module 352; properties pane module 354; pattern based filter module 356; attribute based filter module 358; task sorting module 360; path analysis mode module 362; and MS project import and export module 364. Tabular view module 350 generates a tabular view of a model of a business process as shown and discussed above in connection with FIGS. 1 and 9. Diagram view module 352 generates a graphical or diagram view of a business process as discussed above in connection with FIG. 2. Properties pane module 354 generates a properties pane as discussed above in connection with FIGS. 1 and 2. Pattern based filter module 356 filters business process views based on a pattern entered by the user as discussed above in connection with FIG. 4. Attribute based filter module 358 filters business process views based on an attribute(s) chosen by the user as discussed above in connection with FIG. 5. Task sorting module 360 sorts tasks in the tabular view according to user preferences as discussed above in connection with FIG. 6. Path analysis mode module 362 effects path analysis mode as discussed above in connection with FIG. 7. MS Project import and export module 364 performs import from and export to files formatted as MS Project files, as discussed above in connection with FIG. 8.

Although not separately shown in FIG. 12, business process software 308 also includes: a business process model creation module that allows a user to create a new model of a business process; a business process characterization module that allows features of the model of the business process to be characterized in ways suitable for a collection of interrelated tasks that is designed to be performed repeatedly and further designed to achieve a commonly arising objective or goal; and a business process editing module that allows a user to add, delete and edit tasks (and sub-tasks and sub-sub-tasks and so on) of an existing business process model.

Definitions

Any and all published documents mentioned herein shall be considered to be incorporated by reference, in their respective entireties, herein to the fullest extent of the patent law. The following definitions are provided for claim construction purposes:

Present invention: means at least some embodiments of the present invention; references to various feature(s) of the "present invention" throughout this document do not mean that all claimed embodiments or methods include the referenced feature(s).

Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

First, second, third, etc. ("ordinals"): Unless otherwise noted, ordinals only serve to distinguish or identify (e.g., various members of a group); the mere use of ordinals implies neither a consecutive numerical limit nor a serial limitation.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Business process: a collection of interrelated tasks that is designed to be performed repeatedly and further designed to achieve a commonly arising objective or goal.

Business project: a unique endeavor with a beginning and an end, undertaken to achieve a unique objective or goal.

Tabular form/table: an information set that is visually represented as a two dimensional or three dimensional matrix of fields which primarily hold (but are not necessarily limited to) information in the form of numbers and/or alphanumeric characters.

Tasks: unless otherwise explicitly stated, "tasks" shall collectively refer to proper tasks, sub-tasks, sub-sub-tasks and so on.

Hierarchically organized set of tasks: does not necessarily mean that there is more than one level in the hierarchy; for example, a business process model that had only proper tasks, with no sub-tasks under any of the tasks, is herein considered as a hierarchically organized set of tasks.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A method comprising:
   executing code using one or more processors, wherein the code is stored in a method of one or more tangible computer readable storage media for working with a model of a business process comprised of an ordered and hierarchically organized method of tasks, wherein executing the code causes the one or more processors to perform:
   generating an editable diagram view of the business process in a first window of the graphical user interface to allow a user to edit the diagram view of the business process; and
   generating an editable tabular view in a second window of the graphical user interface of at least a portion of the model of the business process to allow a user to edit the tabular view of the model, the tabular view including a matrix of rows and columns and further including an integration of a hierarchical data structure into the matrix of rows and columns wherein the hierarchical data structure includes hierarchical levels depicted in respective rows of a single column, the tabular view module is further programmed to allow the user by interacting with the second window, from within the tabular view, to add exception flow elements and loops to link the tasks in a business process, wherein in the tabular view the tasks are separated by row and attributes associated with the tasks are separated by columns; and
   executing a business process editing module programmed to allow a user to edit the business process model, wherein the business process editing module further interacts with the diagram view module and the tabular view module to (i) allow the user to switch between the diagram view and the tabular view and (ii) provide bi-directional support of editing the diagram view and the tabular view to update the diagram view as a function of the editable information contained in the tabular view and updating the tabular view as a function of the editable information contained in the diagram view.

2. The method of claim 1 wherein executing the code further causes the one or more processes to perform:
   executing a business process model creation module programmed to allow a user to create a new model of a business process; and
   executing a business process characterization module to allow features of the model of the business process to be characterized to form a collection of interrelated tasks.

3. The method of claim 1 wherein executing the code further causes the one or more processes to perform:

generating a properties pane that provides a visual representation of detailed information associated with a selected task in the tabular view generated by the tabular view module.

4. The method of claim 1 wherein executing the code further causes the one or more processes to perform:
   filtering tasks shown in the tabular view generated by the tabular view module based on a pattern entered by the user.

5. The method of claim 1 wherein executing the code further causes the one or more processes to perform:
   filtering tasks shown in the tabular view generated by the tabular view module based on one or more attribute(s) chosen by the user.

6. The method of claim 1 wherein executing the code further causes the one or more processes to perform:
   sorting tasks shown in the tabular view generated by the tabular view module based upon respective values for an task field selected by the user.

7. The method of claim 1 wherein executing the code further causes the one or more processes to perform:
   displaying a timeline view for each task displayed in the tabular view generated by the tabular view module.

8. The method of claim 7 wherein executing the code further causes the one or more processes to perform:
   displaying a start time for each task displayed in the tabular view generated by the tabular view module.

9. The method of claim 7 wherein executing the code further causes the one or more processes to perform:
   displaying parallel timelines in the timeline view for tasks that run in parallel.

10. The method of claim 1 wherein executing the code further causes the one or more processes to perform:
    executing an MS Project import and export module programmed to: (i) import the model of the business process from a file formatted as an MS Project file, and (ii) export the model of the business process to a file formatted as an MS Project file.

\* \* \* \* \*